Oct. 28, 1924.
G. F. KOLB
AUTOMOBILE BUMPER BRACKET
Filed Sept. 13, 1923
1,513,046
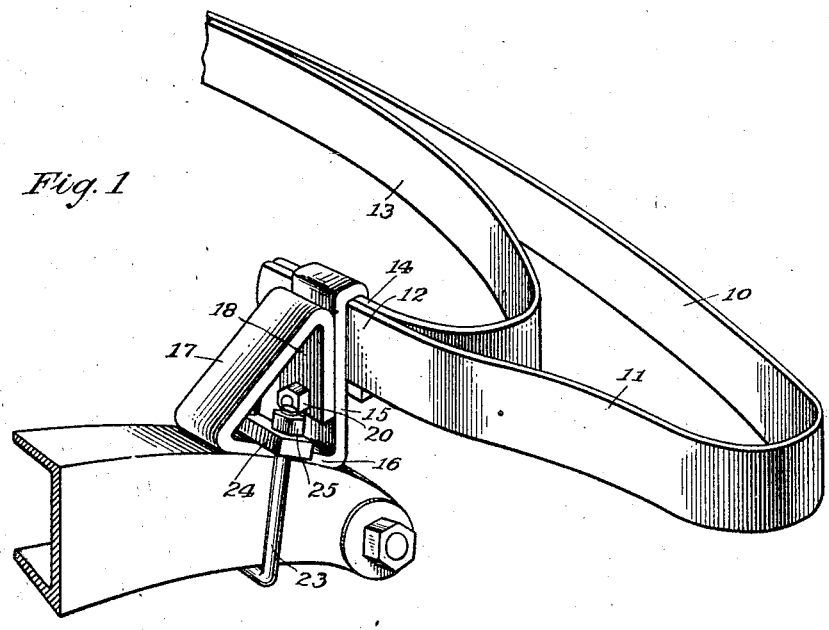
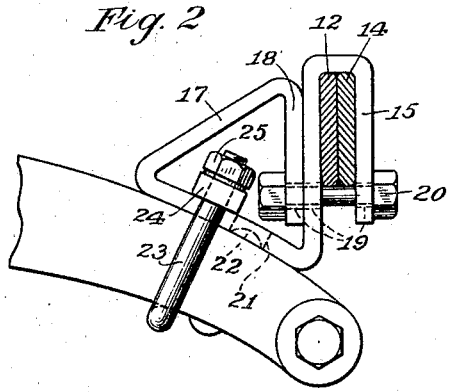
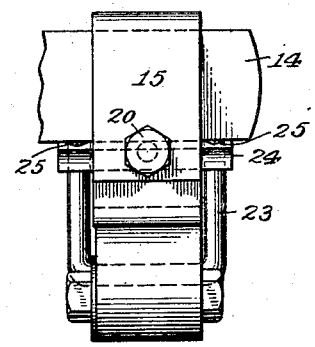
Inventor
George F. Kolb
By Chamberlain & Newman
Attorney Patented Oct. 28, 1924.

1,513,046

UNITED STATES PATENT OFFICE.

GEORGE F. KOLB, OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

AUTOMOBILE BUMPER BRACKET.

Application filed September 13, 1923. Serial No. 662,431.

*To all whom it may concern:*

Be it known that I, GEORGE F. KOLB, a citizen of the United States, and resident of Bridgeport, in the county of Fairfield and State of Connecticut, have invented certain new and useful Improvements in Automobile Bumper Brackets, of which the following is a specification.

This invention relates to an improved bumper bracket, adapted for use upon automobiles, and particularly for attachment to either the front or rear of the frame, an object of the invention being to provide a novel form of attaching bracket, adapted for attachment to the frame ends, and which will be of extremely simple construction. A further object is to provide a bracket constructed from a single piece of strip metal, bent to shape, and which may be efficiently produced in large quantities, by economical fabricating processes.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a perspective outer side and rear view of one end of a bumper attached to a frame end, and provided with an attaching bracket according to the present embodiment of the invention;

Fig. 2 is a side elevation of the attaching bracket; and

Fig. 3 is a front elevation thereof.

Referring to the drawings, the embodiment of the invention shown therein comprises a single convexly curved spring bar bumper 10, having its rear ends bent inwardly, as at 11, and provided with aligned straight attaching portions 12 at its ends, only one being shown. A secondary reinforcing spring bar 13 engages the bar 10 at the rear side and has its inwardly and rearwardly bent end portions 14 overlying the end portions 12 of the bar 10.

The portions 12 and 14 are adapted to be clamped to the attaching brackets, which in turn are attached to the frame ends of the automobile, these ends in the particular type of automobile to which the bumper is adapted being similar at both the front and rear, so that the same type of bracket may be attached at either end. Inasmuch as the attaching brackets at each side are identical, only one will be described in detail.

The attaching bracket is formed from a single strip of strap metal of uniform width, and comprises an inverted U-shaped portion 15 embracing the ends 12 and 14 of the spring bar, the inner leg of the U being extended downwardly to the frame, and from the lower end of which leg a base portion 16 is bent inwardly, being curved slightly to conform to the curvature of the frame and thereby firmly seat thereon.

A bracing portion 17 is bent upwardly and forwardly from the inner end of the base, and from the upper end of said bracing portion a securing portion 18 is bent downwardly along and in contact with the inner leg of the U 15.

Aligned holes 19 are formed in the two legs of the U, directly beneath the lower edges of the spring bars, and in the securing portion, through which holes a clamping bolt 20 is secured to thereby tightly clamp the ends of the spring bars and secure the bracing portion rigidly with respect to the U. It will be noted that the base, bracing portion, and inner leg of the U are substantially in the form of an equilateral triangle and form a strain resisting structure of great strength.

The base 16 is provided with an aperture 21 adapted to engage over the rivet head 22 provided in the frame, and which thereby serves as an anchor to position and retain the bracket. The bracket is secured by means of a stirrup 23 embracing the frame and having its ends extended upwardly through the apertured ends of a cross-bar 24 disposed across the base, and clamped tightly thereto by nuts 25 screwed upon the threaded ends of the stirrup.

The bracket, according to my invention, may be attached without the necessity of drilling the frame, or removing rivets, and supports the bumper bar in an efficient and reliable manner. The design is such that pressure applied to the bumper through impact, will be resisted by the bracket without distortion or loosening.

I have illustrated a preferred and satisfactory embodiment of the invention, but it will be obvious that changes may be made therein, within the spirit and scope thereof, as defined in the appended claims.

Having thus described my invention, what I claim, and desire to secure by Letters Patent is:

1. In an automobile bumper for use upon the frame ends of an automobile, a bumper bar, and an attaching bracket therefor, formed of a strip of metal, one end portion being bent to form an inverted U shaped clamping portion embracing the bumper bar, and the remaining portion forming a base secured to said frame and including an end portion disposed against the U shaped portion, and a single bolt extending through the said clamping portion and end portion to secure the bar therebetween.

2. In an automobile bumper for use upon the frame ends of an automobile, a bumper bar, and an attaching bracket therefor comprising an inverted U shaped clamping portion embracing the end of the bumper bar, a bolt extending through said U shaped portion beneath the bumper bar to clamp the same, a base portion secured to the frame and including an end portion disposed against the U shaped clamping portion and secured thereto by means of the bolt before mentioned.

3. In an automobile bumper for use upon the frame ends of an automobile, a bumper bar, and an attaching bracket therefor formed from a single strip of metal, one end of which strip comprises an inverted U shaped clamping portion embracing the end of the bumper bar, a base portion secured to the frame, a bracing portion extending between the base portion and clamping portion and having its end portion disposed downward against the clamping portion, and a bolt mounted in the U shaped clamping member beneath the base and engaging the free end of the base to clamp the same.

4. In an automobile bumper for use upon the frame ends of an automobile, a bumper bar, and an attaching bracket therefor comprising an inverted U-shaped clamping portion embracing the end of the bumper bar, a base portion secured to the frame, and a bracing portion extending between said base portion and the clamping portion.

5. In an automobile bumper for use upon the frame ends of an automobile, each frame end having a projected rivet head upon the upper surface, a bumper bar, and an attaching bracket therefor comprising a clamping portion embracing the end of the bumper bar, a base portion resting upon the frame and provided with an aperture engaging said rivet head, means adapted to secure said base portion to the frame, and a bracing portion extending between said base portion and the clamping portion.

Signed at Bridgeport, in the county of Fairfield and State of Connecticut, this 11th day of September, A. D. 1923.

GEORGE F. KOLB.

Witnesses:
E. P. BLANCHARD,
T. S. PENDAGAST.